Patented Dec. 18, 1928.

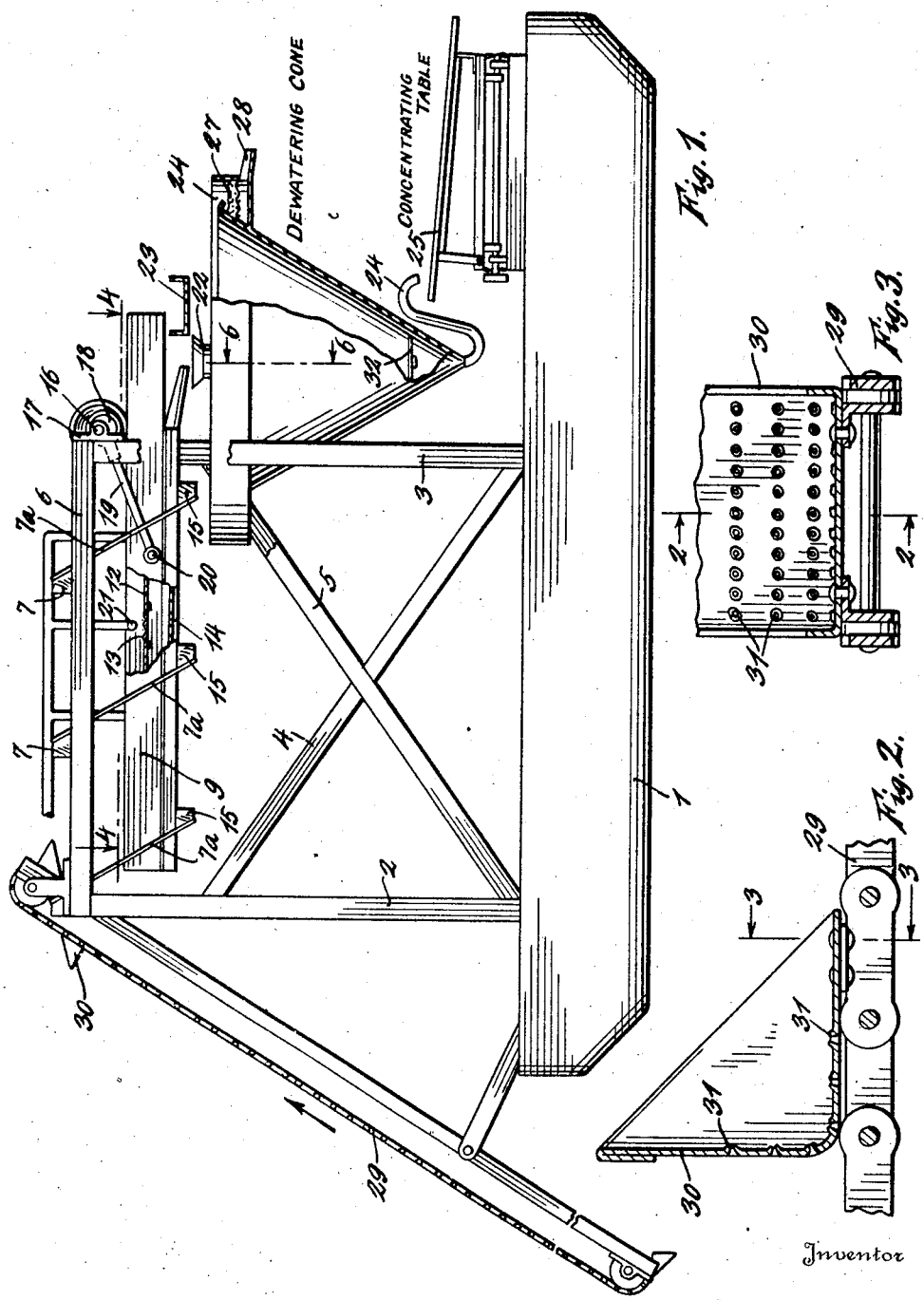

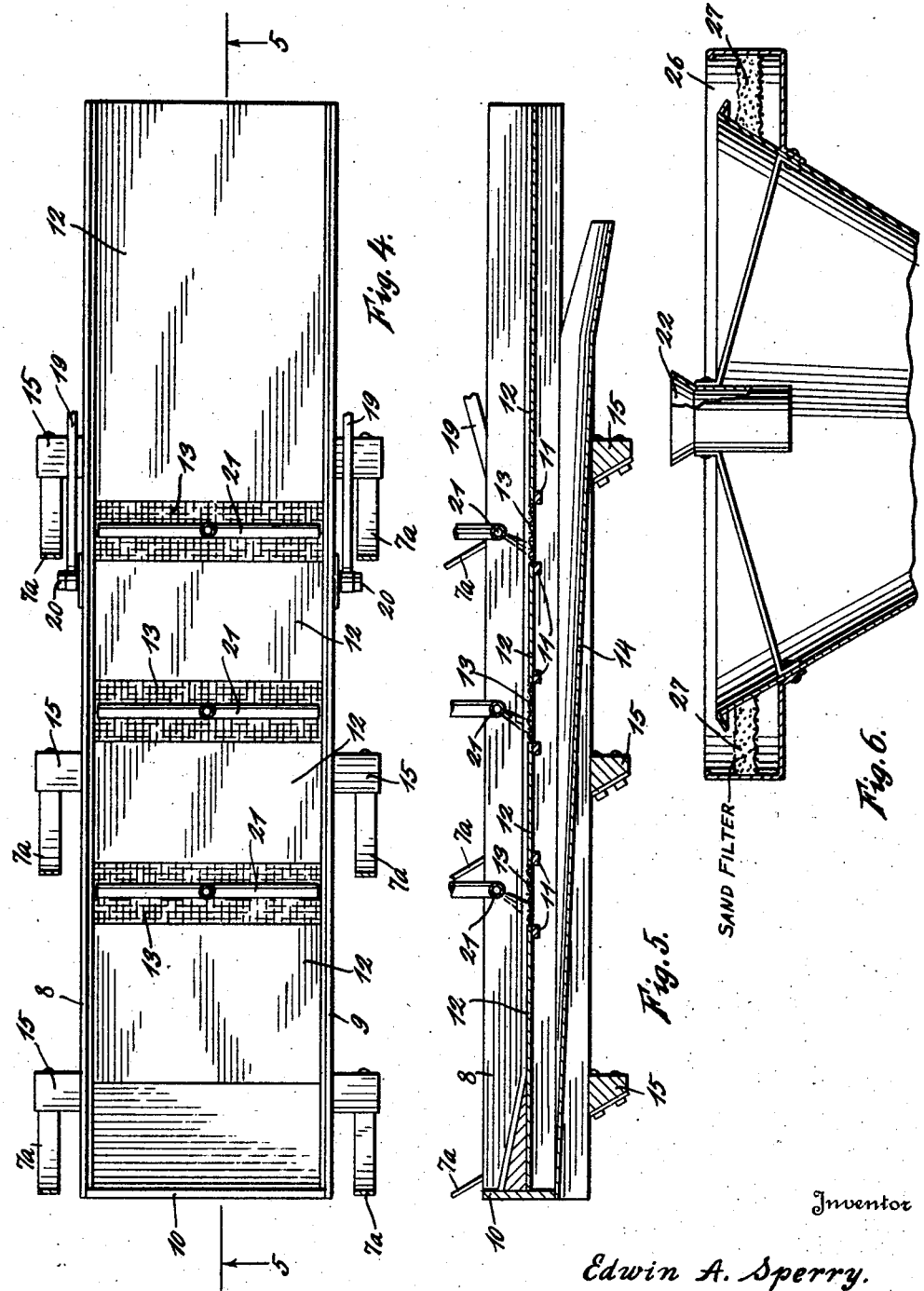

1,695,614

UNITED STATES PATENT OFFICE.

EDWIN A. SPERRY, OF TIENTSIN, CHINA.

APPARATUS FOR THE RECOVERY OF FINE VALUES FROM SAND.

Application filed March 4, 1927. Serial No. 172,724.

This invention relates to improvements in apparatus for recovering gold and other valuable material from sands.

In various parts of the world, gold, platinum and other precious metals are present in considerable quantity in the sands of river beds and in sands that have been washed by the waters of prehistoric streams. This metal, and especially the gold, has been ground to fine dust by the action of the sand and water. It has been found from experience that it is exceedingly difficult to remove this fine flour like gold from the sands and that methods and apparatus that work satisfactorily with ordinary placer sands will not successfully remove the finer values.

I have found that if auriferous sands are first subjected to a selective jig screening whereby the heavier and finer particles are first caused to concentrate in the bottom stratum and then removing this bottom layer by passing it through a screen, that the material thus removed will contain a large percentage of the metal values present in the sands. This mixture of sand and metal is then passed over a concentrating table which further removes the gold and other precious metals from the sand.

In carrying out my method I employ an apparatus which I will now describe in detail, reference for this purpose being had to the accompanying drawings in which the preferred embodiment of my invention has been illustrated and in which:

Fig. 1 is a side elevation of my apparatus, parts being broken away to better disclose the construction;

Fig. 2 is a section taken on line 2—2, Fig. 3 and shows the preferred construction of the dredge buckets;

Fig. 3 is a section taken on line 3—3, Fig. 2;

Fig. 4 is a top plan view taken on line 4—4, Fig. 1;

Fig. 5 is a section taken on line 5—5, Fig. 4, and

Fig. 6 is a section taken on line 6—6, Fig. 1.

In the accompanying drawings numeral 1 designates a scow on which my apparatus is supported when it is employed for treating sands beneath the surface of a lake or river.

Built on top of the scow is a frame work comprising uprights 2 and 3, which are suitably braced by means of cross braces 4 and 5. The upper end of these uprights are connected by means of parallel timbers 6 on which are supported cross timbers 7 of which there may be a plurality, the number depending somewhat upon the size of the apparatus. Supported from the cross timber 7 by means of flexible supporting members 7ª is a jig screen which has been illustrated more in detail in Figures 4 and 5 and which consists of a box having sides 8 and 9 and an end member 10. The sides are connected at intervals by means of transverse bars 11 and on these I support the screen which comprises a plurality of sections 12 of sheet metal which are separated by sections 13 of screen so that the surface of this bottom consists of alternate, imperforate and screen sections as clearly shown in Figures 4 and 5.

Located beneath the screen bottom just described is a transverse sheet metal bottom 14 which forms a chute through which the material that passes through the screen 13 is conducted and ultimately discharged into the dewatering device which will be hereinafter described. It will be noticed that transverse pieces 15 are secured to the lower edges of the side members 8 and 9 and that the supporting bars 7ª have their lower ends attached to these. A shaft 16 is rotatably supported in bearings 17 secured to the upper end of the vertical frame member 3 and this shaft carries two eccentrics 18 one of which is located on each side of the screen box. Connecting rods 19 have one end connected to the eccentrics and the other end connected to the sides of the screen box by means of bolts 20, so that when the shaft is rotated the screen box will be reciprocated through the action of these connecting rods. As the screen box is supported by means of the inclined supporting members 7ª, it is evident that it will travel in an arcuate path and will always have an upward movement when the screen box is moved forwardly and a downward movement when it is moved rearwardly.

This action of the screen box has a tendency to toss the sand so as to produce a forward movement thereof during the forward stroke, while during the rearward stroke the screen moves downwardly away from the sand due to the rapidity of the movement of the screen. This leaves the sand practically suspended and permits the particles to readily stratify. In order to assist the action of the device, I provide streams of water under pressure which issue from openings in the pipes 21 which extend transversely of the screen at points directly above the screen sections 13. The water that is used for this is under considerable pressure so that the streams of water as they issue from the holes will stir the sand so as to loosen it and facilitate the action of gravity in stratifying the particles according to their specific weights. After the particles have been stratified, the lower strata will pass through the screen 13 and drop onto the bottom or the sheet 14 on the chute and will pass from thence into the cylindrical receiver 22 of the dewatering cone. The sand, gravel and other particles which do not pass through the screen sections will continue their passage through the screen box and finally be deposited in the chute 23 and will be conducted to the waste pile.

The mixture of water, sand and metal which is deposited in the dewatering cone, will be subjected to a settling action in which the heavier particles, which includes the metallic values, will settle to the bottom and will flow out through the goose neck 24 and be deposited on the concentrating table 25. The lighter particles will flow over the upper edge of the dewatering cone and into the annular chamber 26 which surrounds the upper edge thereof and will pass through the sand filter 27 where any values that are being carried over will be separated after which the water will flow outwardly through the chute 28.

For the purpose of elevating material from the river bed or from the bottom of the lake, I have provided a conveyor consisting of a chain 29 to which I have connected buckets 30. This conveyor chain moves in the direction indicated by the arrow and as the buckets engage the bottom, they will be filled with sand which they will carry upwardly and deposit in the screen box. I have found from experience that buckets constructed in the ordinary way are not satisfactory for this purpose for the reason that the sand will adhere to their sides and interfere with the proper operation. After a series of experiments I have discovered that if the bottoms of these buckets are perforated in such a way that the metal will be pressed inwardly so as to provide a burr or rough inwardly projecting cone 31 about each hole, that there will be no difficulty experienced from said adhering to these buckets. These holes have been formed in the present device by means of a punch which forces the metal inwardly in the manner indicated in Figure 2. A diaphragm 32 is provided near the bottom of the dewatering cone to prevent caking of the material therein.

The apparatus shown in Figure 1 is, of course, provided with a motor or engine by means of which the conveyor is operated and which rotates the shaft 16.

Let us now assume that the parts are in operation and that the pipes 21 are connected with a water supply of considerable pressure. The conveyor will elevate sand from the bottom of the river and deposit it in the adjacent end of the jig screen. The rotation of the shaft 16 will cause the screen box to be reciprocated, and, as above explained, owing to the forward inclination of the supporting members 7ª, the screen box will move upwardly as it moves forwardly and downwardly when it moves rearwardly. The sand and water that flow through or rest on the section 12 and the screen sections 13 will not be able to stop as quickly as the screen box and will be tossed upwardly at the end of each forward stroke. During this period the action of gravity and the water spray will cause a stratification to take place over the surfaces 12. This will give an effect similar to panning and will cause the heavier particles to migrate to the underside so that they will be in position to pass through the screen sections 13 and onto the bottom 14 of the chute. The material that passes through the screen sections will be delivered to the dewatering cone where a further selective separation will take place, the heavier particles sinking to the bottom and finally passing through the goose neck 24 onto the concentrating table. Any values that pass over the upper edge of the dewatering cone will have to flow onto the sand filter 27 where they will be caught and from which they can later be removed.

I desire to call particular attention to the fact that the screen employed by me has a bottom composed of several sections of imperforate sheets of metal 12 separated by sections 13 of screen; this has an important function, as the sand above the sections 12 will be subjected to a jigging or stratifying action which brings about a stratification of the sand in preparation for the selective screening action which takes place as the sand, thus prepared, passes over the short sections of screen under the stirring action of the water spray. The screen box therefore has a combined action first, it stratifies the material by subjecting it to a panning action that brings the values to the lower surface and after this it subjects the material to a selective screening. This is a result that cannot be obtained with a screen box having a continuous screen bottom but is due almost entirely to the fact that the bottom of the box is made up of alternate sections of imperforate material and screen sections and to the effect of the water spray, all of which combine to produce the result desired.

This application is a continuation in part of application 112,213, filed May 28, 1926, Method and apparatus for recovery of fine value from sand.

Having now described my invention what I claim as new is:

1. In a jig screen having a framework, a screen box having an open discharge end, means for supporting the screen box from the framework comprising straps normally inclined downwardly and forwardly, means for reciprocating the screen box, a panning and stratifying means comprising a plurality of alternate sections of imperforate and screen material located in the screen box and lying substantially in the same plane, and means for directing sprays of water against the upper surface of the screen sections.

2. A jig screen comprising, in combination a screen box having a bottom formed of a plurality of imperforate plates spaced by sections of screen, pipes extending transversely of the screen box above the respective screen sections, said pipes being perforated along their under surfaces whereby when the pipes are connected with a source of water under pressure a plurality of streams of water will be directed against the upper surfaces of the respective screen sections and means for causing each point of said screen box to oscillate in an arcuate path, which lies to one side of a vertical plane passing through the center of oscillation of said point.

3. A jig screen comprising, in combination, a framework, a screen-box, means for reciprocating the box, said box having a discharge chute near one end, means for supporting the screen-box from the framework so that it may be reciprocated with respect thereto, said means comprising links having their upper ends secured to a stationary portion of the framework and having their lower ends secured to a portion of the screen box, the lower ends of said links being nearer the delivery end of the screen box than the upper ends whereby when the box is moved forwardly it will also be moved upwardly, the bottom of said screen box being formed from a plurality of imperforate metal sheets separated by sections of screen and a spray pipe located above each section of screen for directing a water spray downwardly onto any material within the box that is located above the screen whereby a stratifying action is obtained.

In testimony whereof I affix my signature.

EDWIN A. SPERRY.